INVENTOR
KENNETH L. SMITH
BY Imirie & Smiley
ATTORNEYS

April 17, 1962 K. L. SMITH 3,030,019

ELECTRONIC COMPUTING MACHINES

Filed July 20, 1959 5 Sheets-Sheet 2

KENNETH L. SMITH INVENTOR

BY Imirie & Smiley ATTORNEYS

April 17, 1962 K. L. SMITH 3,030,019

ELECTRONIC COMPUTING MACHINES

Filed July 20, 1959 5 Sheets-Sheet 3

Inventor
KENNETH L. SMITH
By [signature]
Attorneys

Inventor
KENNETH L. SMITH
By [signature]
Attorneys

Inventor
KENNETH L. SMITH
By Imrie & Smiley
Attorneys 3,030,019
Patented Apr. 17, 1962

3,030,019

ELECTRONIC COMPUTING MACHINES

Kenneth L. Smith, Southampton, England, assignor to International Computers and Tabulators Limited, London, England, a British company Filed July 20, 1959, Ser. No. 828,241
Claims priority, application Great Britain Aug. 29, 1958
9 Claims. (Cl. 235—157)

Figure 1A:
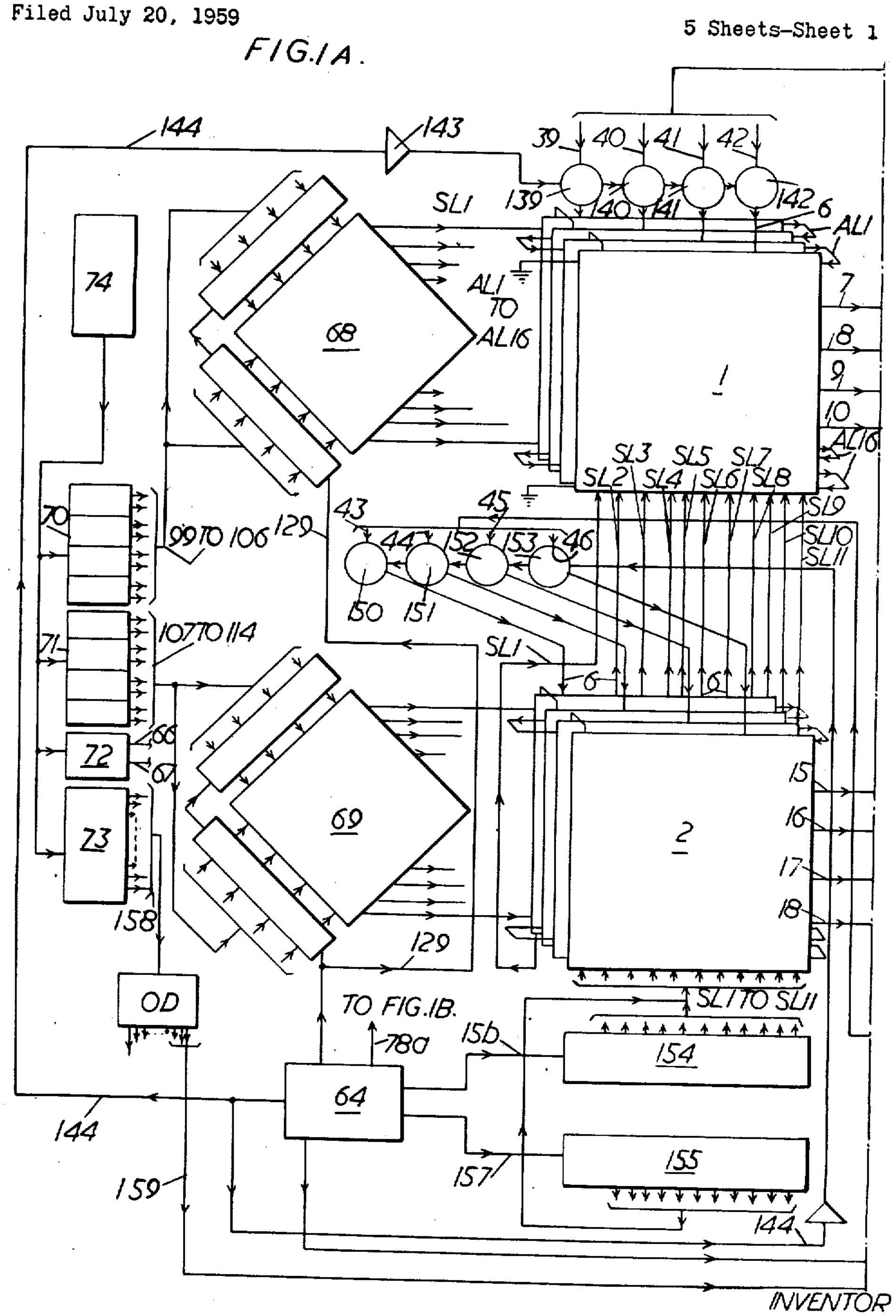

This invention relates to electronic computing machines, and in particular to electronic computing machines of the kind in which data to be operated on is stored and two items of data are transmitted simultaneously from storage to an arithmetic unit where they are computed together to form a result for entry into storage.

It has been proposed to store items of data in storage locations to which immediate access is possible, and simultaneously to read out two items of data one item on each of two lines or groups of lines of which each line or group of lines is connected to an appropriate one of two inputs of an arithmetic unit. Facilities have been provided for transmitting data read from any one of the storage locations to either of the two inputs of the arithmetic unit, and for writing a result transmitted from the arithmetic unit into any one of the storage locations.

When using such prior proposals it has been usual to employ a single addressing device to control these functions, and with the single addressing device it has been proposed to use a three-address code for coding the instructions of a programme of operations.

Each instruction in a three-address code includes three-coded addresses of storage locations, which may be addresses of the storage locations in which the two items of data to be computed are stored, and the address of the storage location into which the result of the computation is to be written.

The decoding of the instructions in a three-address code requires complex decoding and addressing circuits, and because the address of any storage location can be included as any one of the three addresses for three-address code, the addressing circuits have been complicated.

A two-address code has also been proposed which specifies the addresses of two storage locations from which two items of data are read, the result of the computation of the two items being written into one of the storage locations to replace the item of data read therefrom.

It is a main object of the invention to provide an electronic computing machine which is operated by a programme of instructions coded according to a two-address code, and which has much of the flexibility of programming inherent in a three-address code, and in which the addressing circuits are simplified.

According to the invention there is provided an electronic computing machine comprising a first and a second data storage device each having a number of storage locations and each including read means and write means, an arithmetic unit having a result output and having two inputs respectively connected each to one of the read means, a routing switching means connecting the result output to both said write means and operable to switch a result for writing into either of said storage devices, a first and a second addressing device respectively connected to first and second storage devices to control simultaneous addressing of a storage location in each storage device, and a programme device connected to the addressing devices, the arithmetic unit and the routing switching means to control the operation thereof according to a predetermined programme.

The data storage devices may comprise magnetic core storage matrices, and a regeneration circuit may be connected by a read switching means, controlled by the programme device, to both the read means, and may be connected to both the write means by the routing switching means, said regenerative circuit being adapted to control the writing into each matrix of data read therefrom.

Figure 1B:
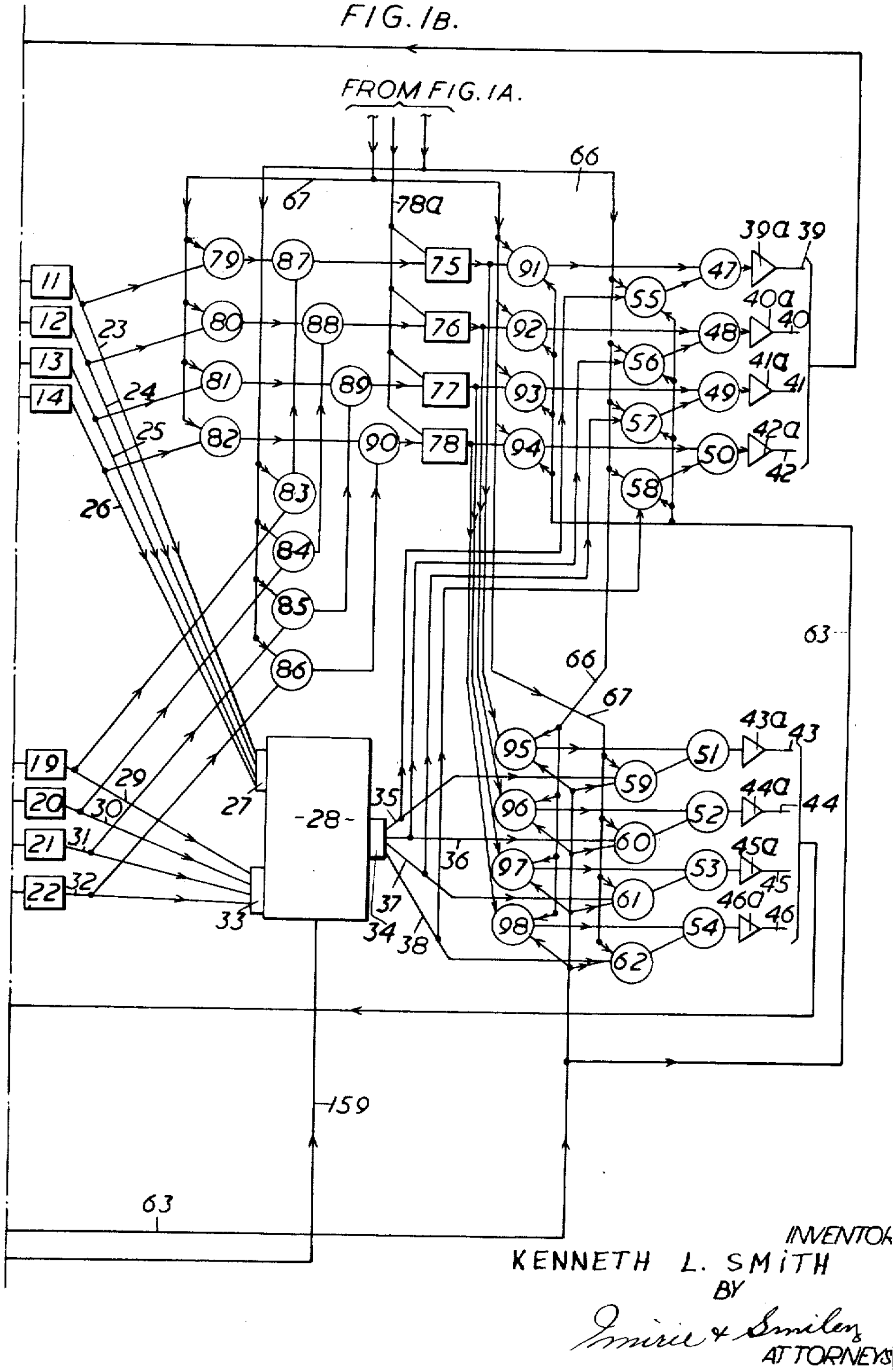
Figure 2:
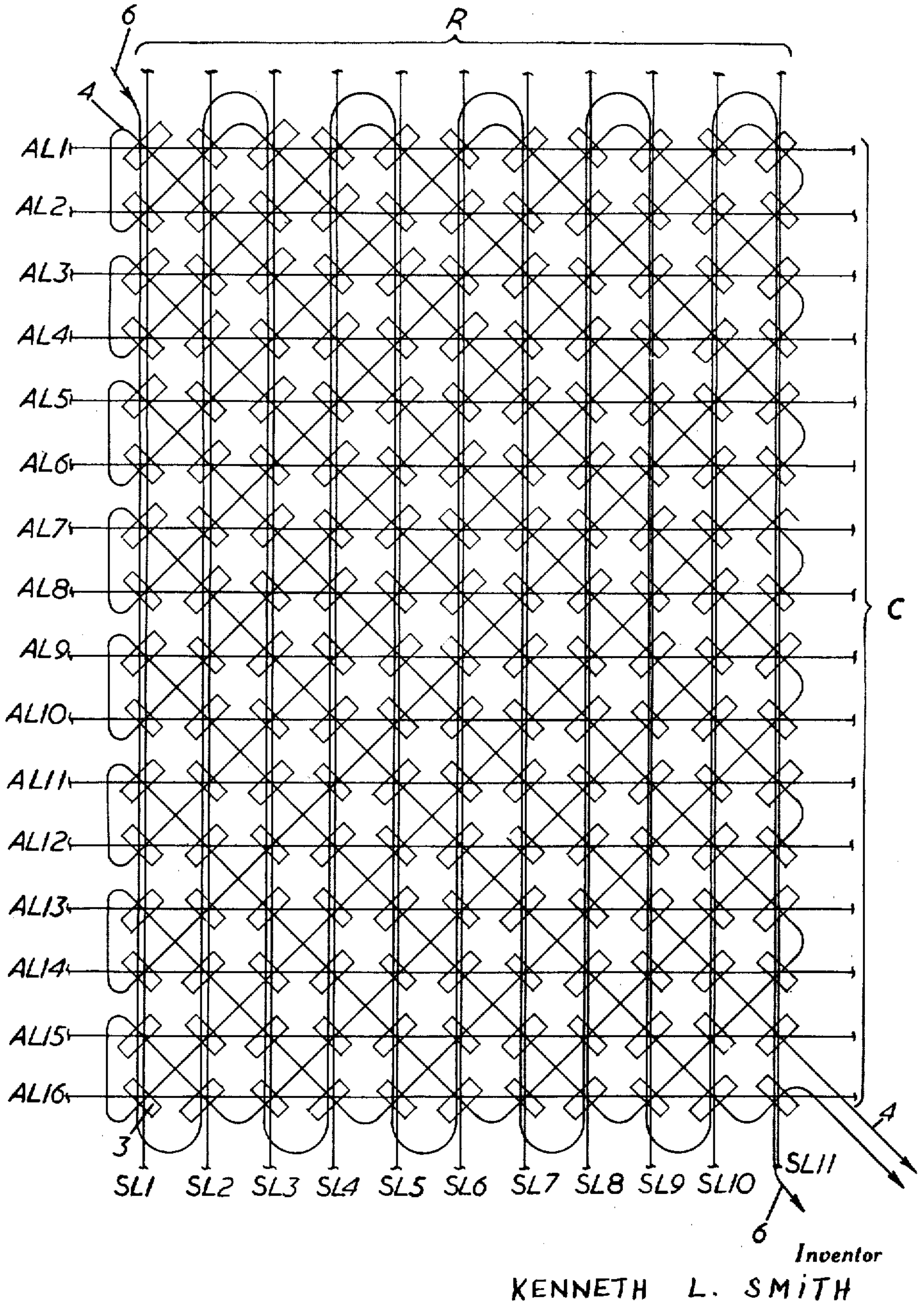
Figure 3:
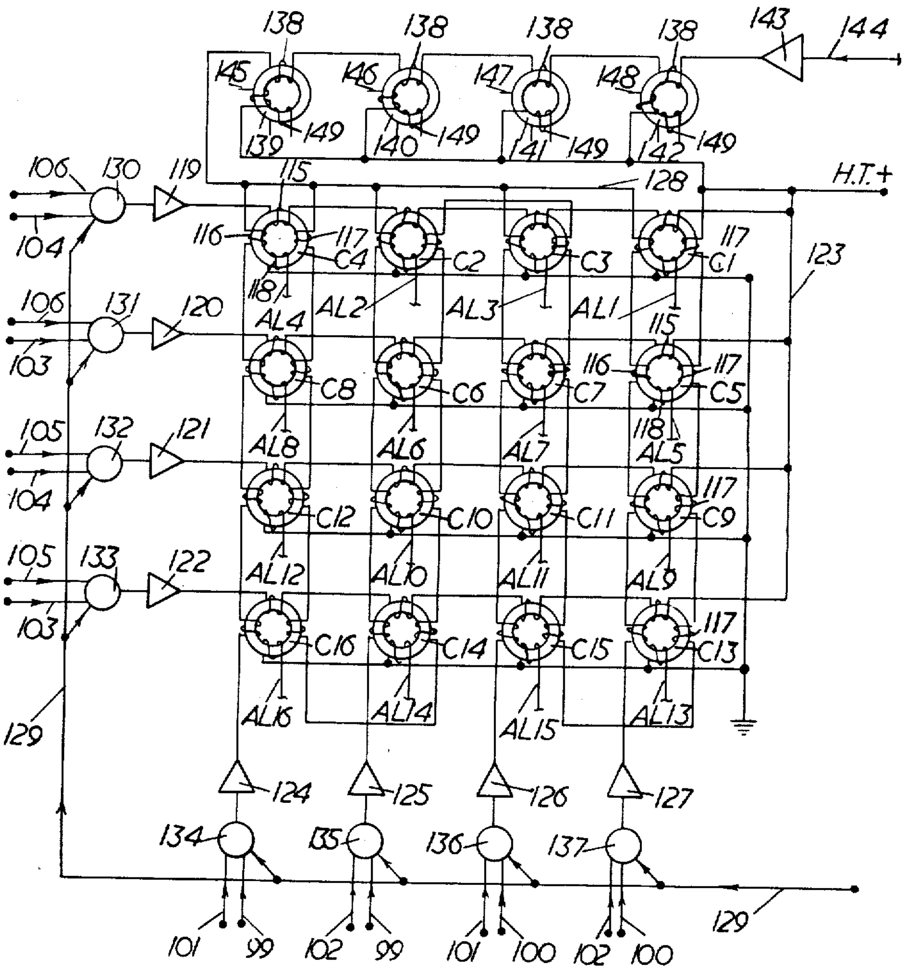
Figure 4:
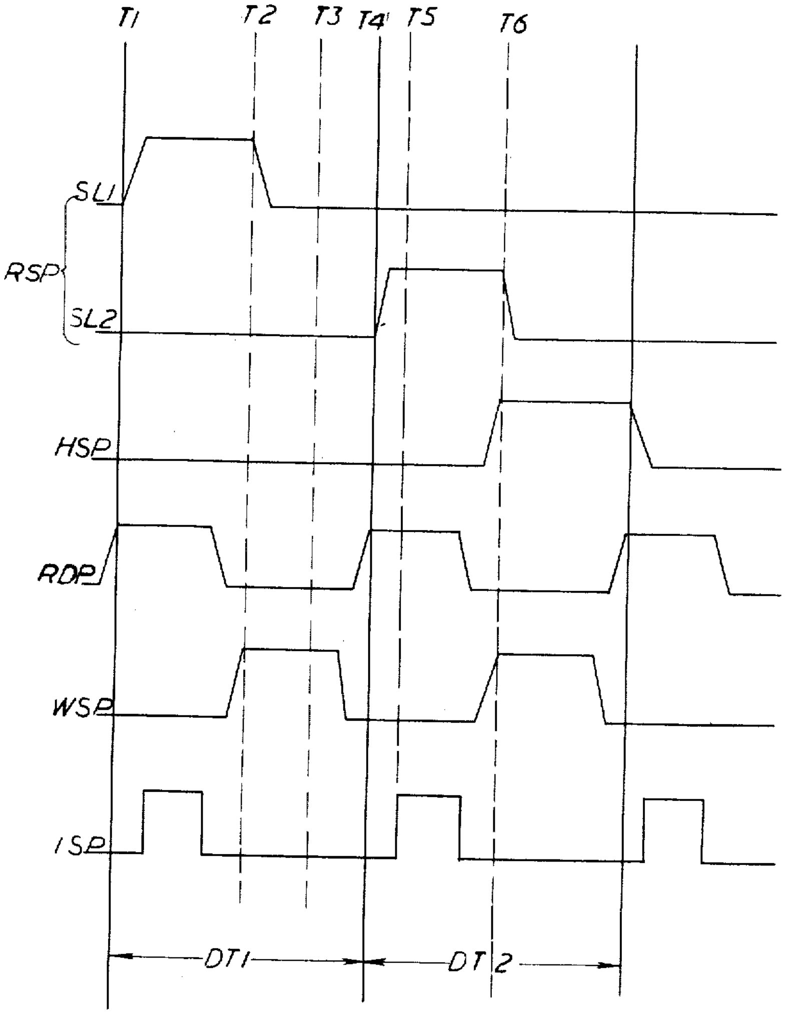

In order that the invention may be clearly understood, an embodiment thereof will now be described, by way of example, with reference to the accompanying drawings in which:

FIGURES 1A and 1B together form a schematic diagram of a part of an electronic computing machine according to the present invention, FIGURE 2 is a magnetic core storage matrix, FIGURE 3 is a circuit diagram of an addressing device for addressing magnetic core storage matrices, and FIGURE 4 is a diagram showing the waveforms of pulses generated in the electronic computing machine.

Referring to FIGURES 1A and 1B of the drawings, an electronic computing machine which is operated by a programme of instructions coded according to a two-address code comprises a first data storage device 1 and a second data storage device 2 for storing numbers coded according to a 1, 2, 4, 8 serial/parallel binary code. Each of the numbers has ten denominational orders, and a sign digit which occurs after the digit of highest denominational order.

Each of the storage devices 1 and 2 consists of a group of four magnetic core storage matrices of the kind shown in FIGURE 2 of the drawings, and each matrix consists of 176 magnetic storage cores 3 arranged in rows R each containing eleven cores and columns C each containing sixteen cores. The cores 3 are of the conventional kind having a square-loop hysteresis characteristic. The four matrices of each store are respectively associated with the digits 1, 2, 4, 8 of the serial/parallel binary code, and a storage location for the storage of a number consists of four corresponding rows of eleven cores, one row in each of the four matrices.

Sixteen address lines AL1 to AL16 are provided, one for each set of four corresponding rows of the four matrices of each storage device 1 and 2, and each address line threads the cores of the four corresponding rows in series. Similarly the cores of each column of each set of four corresponding columns of both storage devices are threaded in series by one of eleven scan lines SL1 to SL11. Each matrix has a read line 4 and an inhibit line 6 which both thread all the cores of the matrix in a known zig-zag manner, to cancel out the currents which are induced in these lines by cores which are partially excited during reading out from and fully or partially excited during writing into the matrix.

The read lines 4 of the matrices of storage device 1 are respectively connected by lines 7, 8, 9 and 10, FIGURE 1A, to read means shown as four read amplifiers 11, 12, 13 and 14, FIGURE 1B and the read lines 4 of the matrices of storage device 2 are respectively connected by lines 15, 16, 17 and 18, FIGURE 1A to read means shown as four read amplifiers 19, 20, 21 and 22, FIGURE 1B. The read amplifiers 11, 12, 13, 14, 19, 20, 21 and 22 are pulse amplifiers of known kind, and the outputs from the read amplifiers 11, 12, 13 and 14 are respectively connected by lines 23, 24, 25 and 26, FIGURE 1B, to one input 27 of an arithmetic unit 28. The outputs from read amplifiers 19, 20, 21 and 22 are respectively connected by lines 29, 30, 31 and 32 to a second input 33 of the arithmetic unit 28. The arithmetic unit 28 is of any suitable known form, which performs basic arithmetic operations which can be completed in a word period for example, the addition of two numbers transmitted to its inputs 27 and 33, and the result of the addition appears at a result output 34 or the subtraction of one number from another by complementary addition.

The result output 34 is connected by lines 35, 36, 37 and 38 to a routing switching means and each digit of the result is represented on lines 35, 36, 37 and 38 as its complement. That is the absence of a binary digit is indicated by a rise in the potential on the appropriate line, and the presence of a binary digit is not so indicated. The routing switching means also includes two sets of four output lines, a first set 39, 40, 41 and 42 being connected to write means for the storage device 1, and the other set 43, 44, 45 and 46 being connected to write means for the storage device 2. The write means for the storage devices 1 and 2 are described in detail below. A group of write mixing circuits 47, 48, 49 and 50, which also form a part of the routing switching means, are respectively connected through pulse amplifiers 39*a*, 40*a*, 41*a* and 42*a* to the output lines 39, 40, 41 and 42, and a second group of write mixing circuits 51, 52, 53 and 54 are respectively connected through pulse amplifiers 43*a*, 44*a*, 45*a* and 46*a* to the output lines 43, 44, 45 and 46. The output lines 35, 36, 37 and 38 from the arithmetic unit 28 are connected to two groups of result gates, which also form a part of the routing switching means, namely result gates 55, 56, 57 and 58 which are connected to the first group of write mixing circuits 47, 48, 49 and 50, and result gates 59, 60, 61 and 62 which are connected to the second group of write mixing circuits 51, 52, 53 and 54.

An inhibit set pulse ISP, FIGURE 4, is transmitted on a line 63, FIGURES 1A and 1B, which is connected to each of the result gates, from a waveform generator 64, FIGURE 1A, and the result gates are conditioned by potentials on lines 66 and 67 which are connected to the instruction register described below. The first group of result gates 55, 56, 57 and 58 are connected to line 66, and the second group of result gates 59, 60, 61 and 62 are connected to line 67.

Each of the storage devices 1 and 2, FIGURE 1A, has an addressing device individual thereto. That is the first storage device 1 has a first addressing device 68 connected thereto, and the second storage device 2 has a second addressing device 69 connected thereto. The addressing device 68 is described in detail below with reference to FIGURE 3, and the addressing devices 68 and 69 are respectively connected to address sections 70 and 71 of an instruction register.

The instruction register, which also includes a routing digit section 72 to which lines 66 and 67 are connected and an order section 73, forms part of a programme device which also includes a programme storage device 74 and instructions are set into the instruction register one at a time in a predetermined sequence determined by the programme storage device 74. The instruction register 70, 71, 72, 73 and programme storage device 74 are of any suitable known kind and are shown only in block diagram form.

When a storage location in one of the storage devices is addressed, the data read from that location is lost. In order to retain that data in storage it is therefore necessary to regenerate it, and a regeneration circuit is provided for this purpose.

The regeneration circuit comprises four delay circuits 75, 76, 77 and 78, FIGURE 1B, of well known kind adapted to introduce a delay equal to the inherent delay in the operation of the simple arithmetic unit 28. Each delay circuit may comprise, for example, two flip-flops connected in series complementary outputs being taken from the output flip-flop of the pair in the same way as from the output 34 of the arithmetic unit 28, and which are connected by a read switching means to the read amplifiers 11, 12, 13, 14, 19, 20, 21, 22. The read switching means includes two sets of four read gates 79, 80, 81, 82 and 83, 84, 85, 86 which are respectively connected to lines 23, 24, 25, 26 and 29, 30, 31, 32 from the read amplifiers. Read gates 79, 80, 81 and 82 are also connected to line 67, and read gates 83, 84, 85 and 86 connected to line 66. The output from read gates 79 and 83; 80 and 84; 81 and 85; and 82 and 86 are respectively connected to read mixing circuits 87, 88, 89 and 90, the outputs from which are connected to the delay circuits 75, 76, 77 and 78.

The routing switching means also includes two groups of regeneration gates, namely regeneration gates 91, 92, 93 and 94, which have inputs respectively connected to the outputs from the delay circuits 75, 76, 77 and 78, and common inputs on lines 63 and 67; and regeneration gates 95, 96, 97 and 98 which also have inputs respectively connected to the outputs from the delay circuits 75, 76, 77 and 78 and have common inputs on lines 63 and 66. The outputs from regeneration gates 91, 92, 93, 94; and 95, 96, 97, 98 are respectively connected to the write mixing circuits 47, 48, 49, 50; and 51, 52, 53 and 54.

Each instruction of a programme is coded according to a two-address code, and each consists of four parts. That is, each instruction takes the form:

Address 1; Address 2; Routing digit; Order.

Fourteen binary digits are allocated to each instruction, four for each address, one for the routing digit, the function of which will be described below, and five for the order. A complete programme of instructions is stored in the programme storage device 74, which may be for example a magnetic core matrix store, and the instructions are transferred one at a time into the instruction register which consists of fourteen flip-flops and is divided into the four sections described above. Sections 70 and 71 each consists of four flip-flops which respectively register addresses 1 and 2, section 72 registers the routing digit, and section 73 consists of five flip-flops which register the order. An output line is connected to each of the outputs from the register flip-flops, so that section 70 of the register has eight output lines 99 to 106 which are connected to the first addressing device 68, and section 71 has eight output lines 107 to 114 which are connected to the second addressing device 69, which is identical with the addressing device 68.

The addressing device 68 is illustrated in FIGURE 3, and comprises sixteen address magnetic cores C1 to C16 arranged in rows and columns as a 4 x 4 address core matrix. Each of the address cores has a row driver winding 115, a column driver winding 116, an inhibit winding 117, and an output winding 118. The four row driver windings 115 in each row are connected in series between a row driver amplifier 119, 120, 121 or 122 and a supply line 123 which is arranged for connection to a source of positive potential. The four column driver windings 116 in each column are similarly connected in series between a column driver amplifier 124, 125, 126 or 127 and a line 128. A row driver gate is connected to each row driver amplifier and a column driver gate is connected to each column driver amplifier, one of the inputs to each row and column driver gate being a read drive pulse applied on line 129 which is connected to each of the gates. Row driver gate 130 has lines 106 and 104 from the instruction register section 70 connected thereto, lines 106 and 103 are connected to row driver gate 131, lines 105 and 104 are connected to row driver gate 132, and lines 105 and 103 are connected to row driver gate 133. Similarly, lines 101 and 99 are connected to column driver gate 134, lines 102 and 99 are connected to column driver gate 135, lines 101 and 100 are connected to column driver gate 136, and lines 102 and 100 are connected to column driver gate 137. The row driver gates and column driver gates form a first stage in the decoding of the outputs from the instruction register section 70 on to sixteen lines for addressing the rows of the storage matrices of storage device 1. These sixteen lines are the lines connected to the output windings 118, each of which is connected to one of the address lines AL1 to AL16 each of which threads in series four corresponding rows of the four matrices of storage device 1. The energising of any one of the output windings 118, FIGURE 3, therefore, causes the addressing of a storage location in the storage device 1.

The inhibit windings 117 are all connected in series between the line 128 and the line 123, and also connected to the line 128 is one end of a series connection of write windings 138, of four inhibit cores 139, 140, 141 and 142, which form a part of the write means for the storage device 1. The other end of this series connection of the write windings 138, is connected to a write driver amplifier 143 which is operable to amplify write drive pulses applied thereto on line 144 from the waveform generator 64, FIGURE 1A. Each of the inhibit cores 139, 140, 141 and 142,, FIGURE 3, is appropriated to one matrix of the storage device 1. Each inhibit core also has a setting winding, respectively 145, 146, 147 and 148 and an output winding 149 which is connected to the inhibit line 6, FIGURES 1A and 2 of the storage matrix appropriate to that core. The setting windings 145, 146, 147 and 148 are respectively connected to the output lines 39, 40, 41 and 42, FIGURES 1A and 1B, and to line 123.

The addressing device 69 for the storage device 2 is identical with the addressing device 68 for the storage device 1 which is described above. The output lines 43, 44, 45 and 46 are connected to inhibit cores 150, 151, 152 and 153 which form a part of the write means for the storage device 2, and which are controlled by write drive pulses on line 144 and the row and column windings of the cores of the devices 69 are connected through row and column driver amplifiers and gates to the section 71 of the instruction register.

The scan lines SL1 to SL11, FIGURE 1A, of each matrix are connected to a read timing device 154 and a write timing device 155, FIGURE 1A, each of which has eleven outputs which are successively energised under control of timing pulses transmitted to the devices on lines 156 and 157 to transmit read scan pulses and write scan pulses on to the scan lines SL1 to SL11. Corresponding outputs from the read and write timing devices are connected in common and each of these common connections is connected to the scan lines SL1 to SL11 which thread the eight storage matrices of the storage devices 1 and 2.

The order section 73 of the instruction register has ten outputs on lines 158. These outputs are decoded by an order decoding device OD, which is a decoding matrix of known kind, control outputs from which are connected to various parts of the machine, to control the operation thereof, for example a number of outputs are connected by lines, indicated generally by line 159, to the arithmetic unit 28, to control the functioning thereof in known manner. The connection of these other output lines from the decoding device OD is not shown, as they form no part of the present invention.

The routing digit section 72 of the instruction register has two outputs on the lines 66 and 67. Only one of the lines 66 and 67 is energised at a time. When the line 66 is energised the first group of result gates 55, 56, 57 and 58; the regeneration gates 95, 96, 97 and 98; and the read gates 83, 84, 85 and 86 are conditioned. Two numbers read from the storage devices 1 and 2 simultaneously in the manner described below are both transmitted to the arithmetic unit 28, and the complement of the result of the computation thereof appears on the lines 35, 36, 37 and 38. The number read from storage device 2 is switched through read gates 83, 84, 85 and 86 to the regeneration delay circuits 75, 76, 77 and 78 and from the delay circuits through regeneration gates 95, 96, 97 and 98 to the output lines 43, 44, 45, and 46, for transmission as its complement to the write means for storage device 2. The result represented as its complement on lines 35, 36, 37 and 38 is switched through results gates 55, 56, 57 and 58 on to output lines 39, 40, 41 and 42 for transmission to the write means of storage device 1. That is, the number read from storage device 2 is regenerated and is rewritten in storage device 2, and the number read from storage device 1 is replaced by the result of the computation.

Similarly, when the line 67 is energised, line 66 is not energised, and read gates 79, 80, 81 and 82, result gates 59, 60, 61 and 62, and regeneration gears 91, 92, 93 and 94 are conditioned so that a number read from storage device 1 is regenerated and rewritten in storage device 1, and a number read from storage device 2 is replaced by a result of the computation.

Because of the delay inherent in the performance of a computation by the arithmetic unit 28, the delay circuits 75, 76, 77 and 78 in the regeneration circuit introduce a delay into that circuit which is the same as that inherent in the arithmetic unit. A digit for regeneration is set in complementary form into the output flip-flops of the delay circuits 75, 76, 77 and 78 at time T3, and the output flip-flops are reset at time T6 by a timing pulse applied thereto on line **78*a* from the waveform generator 64** so that a regenerated number in complementary form and a result in complementary form may be transmitted to the appropriate write means simultaneously.

The inhibit setting pulses ISP on line 63, the read drive pulses RDP on line 129 and the write drive pulses WDP on line 144 are produced by the waveform generator 64 to which lines 63, 129 and 144 are connected, and the waveforms of these pulses are shown in FIGURE 4.

In order to address a storage location in one of the storage devices 1 or 2, FIGURE 1A, a core in the address matrix appropriate to that storage device must be activated. Consider that the fifth storage location in storage device 1, FIGURE 2, is to be addressed, that is, the address line AL5 is to be energized, this line being connected to the output winding 118, FIGURE 3, of the address core C5. Each of the address cores C1 to C16 has a square loop hysteresis characteristic, and has the conventional two stable states which will be referred to hereafter as the "0" state and the "1" state thereof. All the address cores C1 to C16 are considered to be initially in the "0" states thereof, and when a storage location is addressed, the address core appropriate thereto is triggered to the "1" state thereof.

Consider, for example, that the address of storage location 5 has been set in the section 70 of the instruction register, FIGURE 1A, in known manner. The lines 100, 102, 103 and 106, FIGURE 3, are energised, and driver gates 131 and 137 are conditioned at time T1, FIGURE 4, which is the beginning of a digit time DT1 during which the digit of lowest denomination of a number is read from the storage location 5. At time T1 the read drive pulse RDP, FIGURE 4, is applied to line 129, FIGURE 3, by the waveform generator 64, and the read drive pulse RDP passes through the conditioned driver gates 131 and 137 to activate the row driver amplifier 120 and the column driver amplifier 127, both of which are operable to produce, in known manner, a current having a value more than sufficient to trigger any one of the cores C1 to C16 from its "0" state to its "1" state. This current will flow through the row driver winding 115 and the column driver winding 116 of the core C5, and as the windings 115 and 116 are wound on the core C5 in the same sense the total flux induced in the core C5 by the two currents flowing in the windings 115 and 116 is more than twice the current necessary to trigger the core C5 from its "0" state to its "1" state.

The column driver amplifier 127 is connected through the column driver windings 116 of the address cores C1, C5, C9 and C13 to the line 128, and all the inhibit windings 117 of the address cores are connected in series between the line 128 and the potential supply line 123. The inhibit windings 117 are wound in the opposite sense to the windings 115 and 116 and the current flowing through the column driver windings 116 will also flow through all the inhibit windings 117. In the core C5 the total effect will be that the flux induced in the column driver winding 116 will cancel that induced in the inhibit winding 117, so that the actual flux through the core will be that due to the row driver winding 115. As stated above this flux is more than sufficient to trigger the core C5 from its "0" state to its "1" state, and an addressing pulse is produced in its output winding 118 for transmission to the address line AL5, FIGURES 2 and 3.

In each of the address cores C1, C6, C7, C8, C9 and C13 there will be induced a flux due to a current flowing in the row driver winding 115 or column driver winding 116 thereof, as appropriate, but in each of these cores this flux will be cancelled by an opposing flux induced by the current in the inhibit windings 117 thereof, the cores will not be triggered and no output current will be induced in the output windings 118 thereof. In each of the address cores C2, C3, C4, C10, C11, C12, C14, C15 and C16 the only flux induced is that due to the current in the inhibit windings 117 thereof. This flux is in a direction such that it maintains these address cores in the "0" state thereof, and no outputs are induced in the output windings 118 of these cores. At time T2, a write drive pulse WDP is applied on line 144, through the write windings 138 of the inhibit cores 139, 140, 141 and 142 and the inhibit windings 117 of all the address cores C1 to C16. The flux induced in the core C5 will be more than sufficient to trigger it to its "0" state, and at time T4, that is the beginning of the second digit time DT2, the core C5 is in its "0" state.

The only output from the address core matrix 68 to the storage device 1 is therefore an addressing pulse on line AL5 which threads in series the corresponding fifth rows of each of the four storage matrices of storage device 1, and which accordingly addresses the storage location 5, and a reverse pulse at time T2.

During the eleven digit times required to read a number out from the fifth storage location, the lines 100, 102, 103 and 106 are continuously energised by the section 70 of the instruction register. A read drive pulse RDP, FIGURE 4, is transmitted on line 129 to the driver gates during each of the eleven digit times, so that following the resetting of core C5 at time T2 it will again be triggered to its "1" state at time T4 at the beginning of digit time DT2 and will emit a further addressing pulse on line AL5. This process continues for each of the digit times, an addressing pulse being emitted during each of the digit times. The read timing device 154, FIGURE 1A, is controlled through an eleven digit time cycle by timing pulses on line 156 from the waveform generator 64 to transmit read scan pulses RSP successively on the scan lines SL1 to SL11, FIGURE 1B, one in each digit time.

The scan pulses RSP which are transmitted on lines SL1 and SL2 are shown in FIGURE 4. The number of turns of each of the output windings 118 of the address core matrix is such that the addressing current pulses transmitting therefrom to the address lines of the storage matrices are in value one half the current necessary to trigger the storage cores. The read scan current pulses RSP transmitted successively on each of the scan lines SL1 to SL11 from the read timing device 154 also have the value of one half of the current necessary to trigger the storage cores.

The half-current addressing pulse on line AL5 from the address core C5 occurs during the time that the read drive pulse RDP is applied on line 129, and in digit time DT1 is coincident in time with a read scan pulse RSP applied on the first scan line SL1 from the read timing device 154. The scan line SL1 is threaded in series through the first column of each of the four storage matrices of storage device 1, and in the first digit time DT1, the flux in the first storage core 3, in the fifth row of each of these matrices is such as will trigger the core from the "1" state thereof to the "0" state thereof. A core which is in the "1" state thereof indicative of a binary digit stored thereby will be triggered, and an output pulse will appear on the read line 4 which threads it. If the core is in the "0" state thereof indicative of no binary digit stored therein, it will not be triggered and no output pulse will appear on the read line 4. The read line 4 of each matrix is threaded through the cores of that matrix in a known zig-zag manner so that spurious output pulses induced in the read line 4 during reading from or writing into the matrix are of negligible amplitude.

The read lines 4 of each of the matrices of storage device 1 are respectively connected to the lines 7, 8, 9 and 10, and in digit time DT1, the binary digits of the lowest denominational order of the number in storage location 5 are read out from the storage device 1, amplified by the read amplifiers 11, 12, 13 and 14 as appropriate, and transmitted on lines 23, 24, 25 and 26 to the input 27 of the arithmetic unit 28. As described above the addressing core is then reset.

Simultaneously with the reading of the binary digits of lowest denomination from storage location 5 of storage device 1, the binary digits of lowest denomination of a number addressed by the address set up in section 71 of the instruction register will be read out from storage device 2 in an identical manner on to lines 15, 16, 17 and 18 and transmitted to the input 33 of the arithmetic unit 28. A result digit resulting from the computation of the two input digits will not be formed until the time T3, FIGURE 4, and is not written into storage device 1 until a time T6 during the second digit time DT2. A result delay circuit is provided in the arithmetic unit to hold the result digit after it has been formed, and the result digit, which, as stated above, is in complementary form, appears at the result output 34 from time T3 until time T6.

The result digit is to be written into storage location 5 of storage device 1, and line 66 is energised so that the result gates 55, 56, 57 and 58 are conditioned.

Consider the writing of a binary digit of the result into the matrix appropriate to the binary digit 1 of the storage device 1. If the binary digit is 0, the line 35 is up in potential from time T3 until time T6, and at time T5 an inhibit setting pulse ISP, FIGURE 4, is transmitted on line 63, FIGURE 1B, through the gate 55, mixing circuit 47 and amplifier 39*a* on to the line 39 which is connected to the setting winding 145 of the inhibit core 139, FIGURE 3, and the inhibit core 139 is set.

At time T6 a write drive pulse WDP is applied to the write windings 138, core 139 is reset, and an inhibit pulse is induced in the output winding 149 which is connected to the inhibit line 6 of the matrix.

The write drive pulse WDP is also transmitted to line 128 and flows through the inhibit windings 117 of the address cores C1 to C16. The address core C5 which is again triggered to the "1" state thereof at the beginning of digit time DT2, is triggered back to the "0" state by the write drive pulse WDP, and an output half-current pulse is induced in the winding 118 which is of opposite polarity to the half-current pulse induced in this winding during the read operation. This output half-current pulse of opposite polarity is transmitted to the address line AL5, and at the same time a half-current write scan pulse HSP, FIGURE 4, is applied to the scan line SL1 by the write timing device 155, FIGURE 1A, being of opposite polarity to the read scan pulse RSP previously applied thereto. The flux induced in the storage core by the inhibit pulse is in opposition to the combined flux due to the addressing pulse on line AL5 and the write scan pulse SSP on line SL1 and the state of the storage core 3 is not changed.

If the binary digit to be written into this storage core is 1, then the output flip-flop in the delay circuit will not be set so that at time T3, FIGURE 4, the potential of line 35 is down and an inhibit setting pulse is not transmitted to the winding 145 of inhibit core 139 which is accordingly not set. The write drive pulse WDP at time T6 therefore has no effect on the inhibit core 139, and no inhibit pulse is induced in the output winding 149 for transmission to the matrix so that the combined flux due to the addressing pulse on line AL5 and the write scan pulse HSP on line SL1 changes the state of the storage core 3 and a binary digit 1 is written into the lowest denomination of the fifth storage location of storage device 1.

At the same time as the result is being written into storage device 1, the number read from storage device 2 is regenerated and written back into the storage location from which it was read in storage device 2. The delay introduced by the delay circuits 75, 76, 77 and 78 is such that each digit of this number is written into storage device 2 simultaneously with the writing of the digit of the result of corresponding denomination into storage device 1.

In the same way the results of computations on digits read from storage in digit times DT2, DT3, DT4, . . ., are written into storage in digit times DT3, DT4, DT5, . . ., and similarly for digits which are regenerated.

It will be apparent that the electronic computing machine described herein, while using a two-address instruction code, has much of the flexibility of a machine which is operated by instructions coded according to a full three address code, whereas design of the addressing circuits is simplified because each of the two address sections of an instruction can only contain respectively the address of a storage location in one of the two data storage devices. Further, the decoding of each address is achieved simply by eight driver gates and the decoding inherent in the operation of the address core matrix of the appropriate addressing device.

I claim:

1. An electronic computing machine for operating according to a two-address instruction code comprising a first data storage device and a second data storage device each having a number of storage locations, a read means and a write means connected to each said data storage device, an arithmetic unit, two input circuits for said arithmetic unit respectively connected each to one of said read means, a result output circuit for said arithmetic unit, a routing switching means connecting said result output circuit to both said write means and operable to switch a result for writing into either of said storage devices, a first addressing device and a second addressing device respectively connected to the first storage device and the second storage device to control simultaneous addressing of a storage location in each storage device, and an instruction register connected to the arithmetic unit and the routing switching means to control their operation according to an instruction stored in said register and including a first address section and a second address section respectively connected to said first and second addressing devices, whereby the storage locations of the first storage device are addressed only by the first address of an instruction and the storage locations of the second storage device are addressed only by the second address.

2. An electronic computing machine for operating according to a two-address instruction code, comprising a first magnetic core storage matrix and a second magnetic core storage matrix each having a number of storage locations, a read means and a write means connected to each said storage matrix, an arithmetic unit, two input circuits for said arithmetic unit respectively connected each to one of said read means, a result output circuit for said arithmetic unit, a routing switching means connecting said result output to both said write means and operable to switch a result for writing into either of said storage matrices, a first addressing device and a second addressing device respectively connected to the first storage matrix and the second storage matrix to control simultaneous addressing of a storage location in each said matrix, a data feed-back circuit, connected to both said read means and to said routing switching means and being adapted to control the writing into each matrix of data read therefrom, read switching means connecting the data feed-back circuit to both said read means and an instruction register connected to the arithmetic unit, the routing switching means and the read switching means to control their operation according to an instruction stored in said register and including a first address section and a second address section respectively connected to said first and second addressing devices, whereby the storage locations of the first storage device are addressed only by the first address of an instruction and the storage locations of the second storage device are addressed only by the second address.

3. An electronic computing machine according to claim 2, wherein each addressing device comprises a number of address magnetic cores arranged as an address core matrix, the address cores being connected one to each row of a storage matrix, and a number of driver circuits connected one to each row and column of the address core matrix and controlled by the appropriate address section of the instruction register to trigger the appropriate address core for selecting a predetermined storage location.

4. An electronic computing machine for operating according to a two-address instruction code, comprising for storing numbers coded according to a 1, 2, 4, 8 serial/parallel code, a first group of four magnetic core storage matrices each appropriated to one digit of the code, a second group of four magnetic core storage matrices each appropriated to one digit of the code, each said group of storage matrices having a number of storage locations, a read-out winding for each matrix, eight read amplifiers one for each matrix connected to the read-out winding thereof, a write means for each storage matrix, an arithmetic unit, two input circuits for said arithmetic unit respectively connected each to the four read amplifiers of one of said groups of four matrices, a result output circuit for said arithmetic unit, a routing switching means connecting said result output to both said write means and operable to switch a result for writing into either of said groups of storage matrices, a first addressing device and a second addressing device respectively connected to the first group of storage matrices and the second group of storage matrices to control simultaneous addressing of a storage location in each of said groups, a data feed-back circuit, two sets of four read gates each having an input connected to the read amplifier associated with one of said storage matrices, four read mixing circuits each connected to the outputs from corresponding gates of said two sets of four read gates and being each connected to said data feed-back circuit to provide an input thereto, said data feed-back circuit being connected to said routing switching means and being adapted to control the writing into each matrix of data read therefrom, and an instruction register connected to the arithmetic unit, the routing switching means and the read gates to control their operation according to an instruction stored in said register and including a first address section and a second address section respectively connected to said first and second addressing devices, whereby the storage locations of the first storage device are addressed only by the first address of an instruction and the storage locations of the second storage device are addressed only by the second address.

5. An electronic computing machine according to claim 4, wherein the data feed-back circuit includes four delay circuits the inputs of which are respectively connected to the outputs from the read mixing circuits, and the outputs from which are connected to the routing switching means.

6. An electronic computing machine according to claim 5, wherein the routing switching means includes two sets of four output lines respectively connected to the write means for the first and second groups of storage matrices, two groups of four write mixing circuits each group respectively connected to the output lines of one of the sets of output lines, two sets of four result output gates connected to the result output circuit of the arithmetic unit, and two sets of four delay output gates connected to the outputs from the delay circuits, the outputs from corresponding result and delay output gates are both connected to the appropriate write mixing circuit, and the result output gates and delay output gates are respectively operable by the instruction register to switch a result from the arithmetic unit for writing into one of the groups of storage matrices and to switch to the write means for the other group of storage matrices data read from said other group of storage matrices.

7. An electronic computing machine for operating according to a two-address instruction code, comprising for storing numbers coded according to a 1, 2, 4, 8 serial/parallel code, a first group of four magnetic core storage matrices each appropriated to one digit of the code, a second group of four magnetic core storage matrices each appropriated to one digit of the code, each said group of storage matrices having a number of storage locations, a read-out winding for each matrix, eight read amplifiers one for each matrix connected to the read-out winding thereof, a write means for each storage matrix, an arithmetic unit, two input circuits for said arithmetic unit respectively connected each to the four read amplifiers of one of said groups of four matrices, a result output circuit for said arithmetic unit, a routing switching means connecting said result output to both said write means and operable to switch a result for writing into either of said groups of storage matrices, a first address core matrix whose cores are connected one to each set of four corresponding rows of the matrices of the first group of storage matrices, a second address core matrix whose cores are connected one to each set of four corresponding rows of the matrices of the second group of storage matrices, a first assembly of driver circuits connected one to each row and column of the first address core matrix, a second assembly of driver circuits connected one to each row and column of the second address core matrix, a data feed-back circuit, two sets of four read gates each having an input connected to the read amplifier associated with one of said storage matrices, four read mixing circuits each connected to the outputs from corresponding gates of said two sets of four read gates and being each connected to said data feed-back circuit to provide an input thereto, said data feed-back circuit being connected to said routing switching means and being adapted to control the writing into each matrix of data read therefrom, and an instruction register including a first address section and a second address section respectively connected to the first and second assemblies of driver circuits to control the simultaneous triggering of an address core in each address core matrix whereby a storage location in each of said groups of storage matrices is simultaneously addressed, and said instruction register being connected to the arithmetic unit, the routing switching means and the read gates to control operation thereof according to an instruction stored in said register.

8. An electronic computing machine according to claim 7, wherein the data feed-back circuit includes four delay circuits the inputs of which are respectively connected to the outputs from the read mixing circuits, and the outputs from which are connected to the routing switching means.

9. An electronic computing machine according to claim 8, wherein the routing switching means includes two sets of four output lines respectively connected to the write means for the first and second groups of storage matrices, two groups of four write mixing circuits each group respectively connected to the output lines of one of the sets of output lines, two sets of four result output gates connected to the result output circuit of the arithmetic unit, and two sets of four delay output gates connected to the outputs from the delay circuits, the outputs from corresponding result and delay output gates are both connected to the appropriate write mixing circuit, and the result output gates and delay output gates are respectively operable by the instruction register to switch a result from the arithmetic unit for writing into one of the groups of storage matrices and to switch to the write means for the other group of storage matrices data read from said other group of storage matrices.

References Cited in the file of this patent

UNITED STATES PATENTS 2,798,216 Goldberg et al. ---------- July 2, 1957

OTHER REFERENCES

National Bureau of Standards Computer Development (Seac and Dyseac at the National Bureau of Standards, NBS Circular 551; 1955, pages 5 to 17 relied on).